United States Patent [19]
Cox

[11] Patent Number: 5,848,155
[45] Date of Patent: Dec. 8, 1998

[54] SPREAD SPECTRUM WATERMARK FOR EMBEDDED SIGNALLING

[75] Inventor: Ingemar J. Cox, Lawrenceville, N.J.

[73] Assignee: NEC Research Institute, Inc., Princeton, N.J.

[21] Appl. No.: 708,331

[22] Filed: Sep. 4, 1996

[51] Int. Cl.$^6$ ................................................. H04L 9/00
[52] U.S. Cl. ................................................. 380/4; 380/34
[58] Field of Search ................................. 380/4, 28, 34

[56] References Cited

U.S. PATENT DOCUMENTS

| | | | |
|---|---|---|---|
| 4,939,515 | 7/1990 | Adelson | 341/51 |
| 5,319,735 | 6/1994 | Preuss et al. | 395/2.14 |
| 5,530,751 | 6/1996 | Morris | 380/4 |
| 5,530,759 | 6/1996 | Braudaway | 380/54 |
| 5,568,570 | 10/1996 | Rabbani | 382/238 |
| 5,613,004 | 3/1997 | Cooperman et al. | 380/28 |
| 5,636,292 | 6/1997 | Rhoads | 382/232 |
| 5,646,997 | 7/1997 | Barton | 380/23 |
| 5,659,726 | 8/1997 | Sandford, II et al. | 395/612 |
| 5,664,018 | 9/1997 | Leighton | 380/4 |

FOREIGN PATENT DOCUMENTS

| | | | |
|---|---|---|---|
| 0690595 | 1/1995 | European Pat. Off. | |
| 2196167 | 4/1988 | United Kingdom . | |
| 8908915 | 9/1989 | WIPO . | |
| 9520291 | 7/1995 | WIPO . | |
| 9621290 | 7/1996 | WIPO | H04H 1/00 |
| 9625005 | 8/1996 | WIPO | H04H 7/08 |
| 9627259 | 9/1996 | WIPO . | |

OTHER PUBLICATIONS

R.G. Van Schyndel et al, "A digital watermark," in Intl. Conf. On Image Processing, vol. 2, pp. 86–90, 1994.

G. Caronni, "Assuring Ownership Rights for Digital Images," in Proc. Reliable IT Systems, VIS '95, 1995.

J. Brassil et al, "Electronic Marking and Identification Techniques to Discourage Document Copying," in Proc. Infocom '94, pp. 1278–1287, 1994.

K. Tanaka et al., "Embedding Secret Information into a Dithered Multi–level Image," in IEEE Military Comm. Conf., pp. 216–220, 1990.

K. Mitsui et al, "Video–Steganography: How to Secretly Embed a Signature in a Picture," in IMA Intellectual Property Project Proc., vol 1, pp. 187–206, 1994.

Macq and Quisquarter, "Cryptology for Digital TV Broadcasting," in Proc. of the IEEE, vol. 83, No. 6, pp. 944–957, 1995.

W. Bender et al, "Techniques for data hiding," in Proc. of SPIE, vol. 2420, No. 40, Jul. 1995.

Koch, Rindfrey and Zhao, "Copyright Protection for Multimedia Data," in Proc. of the Int'l Conf. on Digital Media and Electronic Publishing (Leeds, UK, 6–8 Dec, 1994).

Koch and Zhao, "Towards Robust and Hidden Image Copyright Labeling," in Proc. of 1995 IEEE Workshop on Nonlinear Signal and Image Processing (Neos Marmaras, Halkidiki, Greece, Jun. 20–22, 1995.

Zhao and Koch, "Embedding Robust Labels Into Images For Copyright Protection,"in Proc. Int. Congr. on IPR for Specialized Information, Knowledge and New Technologies (Vienna, Austria), Aug. 21–25, 1995.

"Digital Copyright: Who Owns What?" NewMedia, Sep. 1995, pp. 38–43.

"Publish and Be Robbed?" New Scientist, 18 Feb. 1995, pp. 32–37.

Kohno et al, "Spread Spectrum Access Methods for Wireless Communications," in IEEE Communications Magazine, Jan. 1995, pp. 58–67, 116.

(List continued on next page.)

*Primary Examiner*—Salvatore Cangialosi
*Attorney, Agent, or Firm*—Philip J. Feig

[57] ABSTRACT

A watermark is embedded into audio/video/image/multimedia data using spread spectrum methodology. The watermark is extracted from watermarked data without the use of an original or unwatermarked version of the data by using spatial or temporal local averaging of the frequency coefficients of the watermarked data.

22 Claims, 9 Drawing Sheets

OTHER PUBLICATIONS

Campana and Quinn, "Spread spectrum communications," in IEEE Potentials, April 1993, pp. 13–16.

Mowbray and Grant, "Wideband coding for uncoordinated multiple access communication," in Electronics & Communication Engineering Journal, Dec. 1992, pp. 351–361.

Digimarc Overview & "Wired" Magazine article (Jul. 1995 issue)—Jun. 1995.

A.G. Bors et al., "Image Watermarking Using DCT Domain Constraints", Dept. Of Informatics, University of Thessaloniki.

I.J. Cox et al., "Secure Spread Spectrum Watermarking for Multimedia", NEC Research Institute, Technical Report 95–10.

H.S. Stone, "Analysis of Attacks on Image Watermarks with Randomized Coefficients", NEC Research Institute, May 17, 1996.

F.M. Boland et al., "Watermarking Digital Images for Copyright Protection", Image Processing and its Applications, Jul. 4–6, 1995, Conference Publication No. 410, pp. 326–330.

L. Boney et al., "Digital Watermarks for Audio Signals".

Swanson et al., "Transparent Robust Image Watermarking", Proc. IEEE Int. Conf. On Image Proc. 1996.

J.J.K. O. Ruanaidh et al., "Phase Watermarking of Digital Images".

I. Pitas, "A Method for Signature Casting on Digital Images".

C.T. Hsu et al., "Hidden Signatures in Images", ICIP 96 Conf. Proc., Sep. 16–19, 1996.

M. Schneider et al., "A Robust Content Based Digital Signature for Image Authentication", ICIP 96 Conf. Proc., Sep. 16–19, 1996.

S. Roche et al., "Multi–Resolution Access Control Algorithm Based on Fractal Coding", ICIP 96 Conf. Proc., Sep. 16–19, 1996.

K. Hirotsugu, "An Image Digital Signature System with ZKIP for the Graph Isomorphism", ICIP 96 Conf. Proc., Sep. 16–19, 1996.

R.B. Wolfgang et al., "A Watermark for Digital Images".

J.J.K. O. Ruanaidh et al., "Watermarking Digital Images for Copyright Protection", EVA 96 Florence, pps. 1–7.

T. Aura, "Invisible Communication", Nov. 6, 1995.

D. Kahn, "Information Hiding—An Annotated Bibliography", Macmillan 1967, Library of Congress catalog no. 63–16109.

Craver et al., "Can Invisible Watermarks Resolve Rightful Ownerships?", IBM Research Report .

Podilchuck et al., "Digital Image Watermarking Using Visual Models", Proc. of EI'97, vol. 3016, Feb. 9–14, 1997.

Cox et al., "A review of watermarking and the importance of perceptual modeling", Proc. of EI'97, vol. 3016, Feb. 9–14, 1997.

Watson, "DCT quantization matrices visually optimized for individual images", SPIE, vol. 1913, pps. 202–216.

Ahumada, Jr. et al., "Luminance–Model–Based DCT Quanization for Color Image Compression", SPIE, vol. 1666(1992), pp. 365–374.

Hartung et al., "Digital Watermarking of Raw and Compressed Video", Systems for Video Communication, Oct. 1996, pp. 205–213.

| 1 | 4 | 5 | 16 |
|---|---|---|----|
| 2 | 3 | 6 | 15 |
| 9 | 8 | 7 | 14 |
| 10 | 11 | 12 | 13 |

Fig 10

SPREAD SPECTRUM WATERMARK FOR EMBEDDED SIGNALLING

FIELD OF THE INVENTION

The present invention relates to digital watermarking of data including audio, video, image and multimedia data. Specifically, the invention relates to the extraction of a watermark of embedded data from watermarked data without using an original or unwatermarked version of the data.

BACKGROUND OF THE INVENTION

The proliferation of digitized media such as video, image, audio and multimedia is creating a need for a security system which facilitates the identification of the source of the material.

Context providers, i.e. owners of works in digital data form, have a need to embed signals into audio/video/image/multimedia data which can subsequently be recorded or detected by software and/or hardware devices for purposes of authenticating copyright ownership, control and management.

For example, a coded signal might be inserted in data to indicate that the data should not be copied. The embedded signal should preserve the image fidelity, be robust to common signal transformations and resistant to tampering. In addition, consideration must be given to the data rate that can be provided by the system, though current requirements are relatively low—a few bits per frame.

In U.S. patent application Ser. No. 08/534,894, filed Sep. 28, 1995, entitled "Secure Spread Spectrum Watermarking for Multimedia Data" now abandoned and assigned to the same assignee as the present invention, there was proposed a spread spectrum watermarking method which embedded a watermark signal into perceptually significant regions of an image for the purposes of identifying the content owner and/or possessor. A strength of this approach is that the watermark is very difficult to remove. In fact, this method only allows the watermark to be read if the original image or data is available for comparison. This is because the original spectrum of the watermark is shaped to that of the image through a non-linear multiplicative procedure and this spectral shaping must be removed prior to detection by matched filtering and the watermark is inserted into the N largest spectral coefficients, the ranking of which is not preserved after watermarking. Thus, this method does not allow software and hardware devices to directly read embedded signals.

In an article by Cox et al., entitled "Secured Spectrum Watermarking for Multimedia", NEC Research Institute Inc., Technical Report 95-10, spread spectrum watermarking is described which embed a pseudo-random noise sequence into the digital data for watermarking purposes.

The prior art watermark extraction methodology requires the original image spectrum be subtracted from the watermark image spectrum. This restricts the use of the method when there is no original image or original image spectrum available. One application where this presents a significant difficulty is for third party device providers desiring to read embedded information for operation or denying operation of such a device.

The present invention extends the earlier work of Cox et al to allow the reading or extraction of embedded signals by devices which do not contain original data, e.g. original images.

In U.S. Pat. No. 5,319,735 by R. D. Preuss et al entitled "Embedded Signalling" digital information is encoded to produce a sequence of code symbols. The sequence of code symbols is embedded in an audio signal by generating a corresponding code signal representing the sequence of code symbols. The frequency components of the code signal being essentially confined to a preselected signalling band lying within the bandwidth of the audio signal and successive segments of the code signal corresponds to successive code symbols in the sequence. The audio signal is continuously frequency analyzed over a frequency band encompassing the signalling band and the code signal is dynamically filtered as a function of the analysis to provide a modified code signal with frequency component levels which are, at each time instant, essentially a preselected proportion of the levels of the audio signal frequency components in corresponding frequency ranges. The modified code signal and the audio signal are combined to provide a composite audio signal in which the digital information is embedded. This component audio signal is then recorded on a recording medium or is otherwise subjected to a transmission channel.

SUMMARY OF THE INVENTION

The present invention overcomes the limitations of the prior systems by using spread spectrum technology to embed watermark data or information into predetermined locations in an image.

More specifically, the invention provides a system for extracting a watermark from watermarked data without using an original or unwatermarked version of the data.

The preferred method of watermarking extraction is to use a spatial or temporal local average of the frequency coefficients of the watermarked data to determine the watermark. The frequency coefficients of a two-dimensional neighborhood in two-dimensional watermarked data (e.g. an image), for example, are analyzed to reproduce the entire watermark. This is possible since the watermark is embedded into the data using spread spectrum technology which places the watermark throughout the data.

The invention is applicable to the watermarking of audio/video/image/multimedia data.

The invention will be best understood when the following description is read in conjunction with the accompanying drawing.

DETAILED DESCRIPTION

Figure 1:
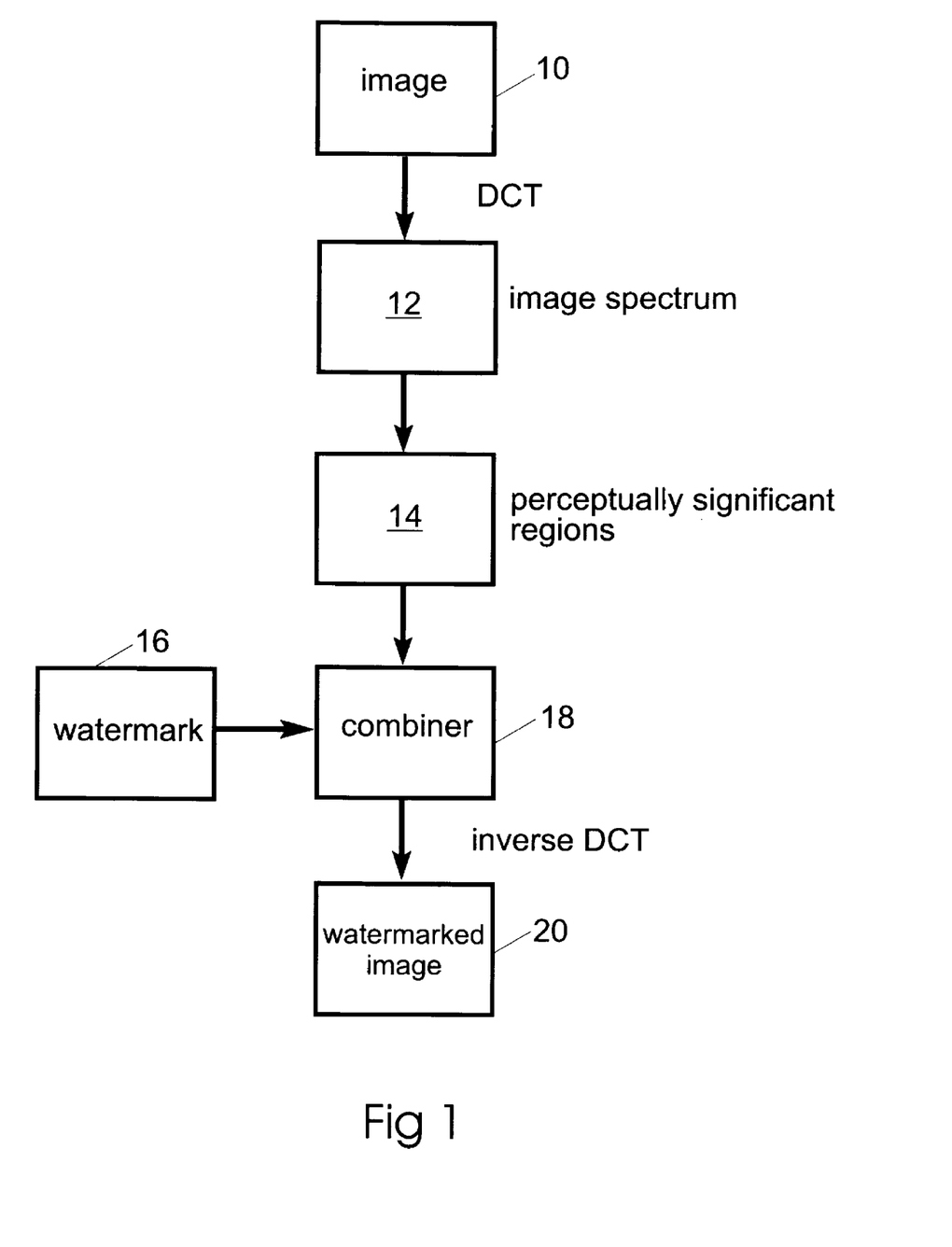
FIG. 1 is a schematic block diagram of a method of inserting a watermark into an image.

Referring now to the figures and to FIG. 1 in particular, there is shown a schematic block diagram of a method for inserting a watermark into a digital data, for instance an image. In the following description reference may be made to image data or images. While the invention has applicability to image data and images, it will be understood that the teachings herein and the invention itself are equally applicable to audio, video, image and multimedia data and the term image and image data will be understood to include these terms where applicable. As used herein watermark will be understood to include embedded data, symbols, images, instructions or any other identifying information.

The image 10 is first transformed into a spatial frequency representation 12, for instance by a discrete cosine transform (DCT), other transforms such as a fast Fourier transform could also be used. The spectrum is then analyzed to determine the perceptually most significant components 14 and the watermark to be imbedded 16 is then combined 18 with the perceptionally most significant components. The watermark is a pseudo random number sequence (PNS) preferably chosen from a Gaussian distribution. After being combined, the modified image is then inverse transformed back into the spatial domain to create the watermarked image 20.

Figure 2:
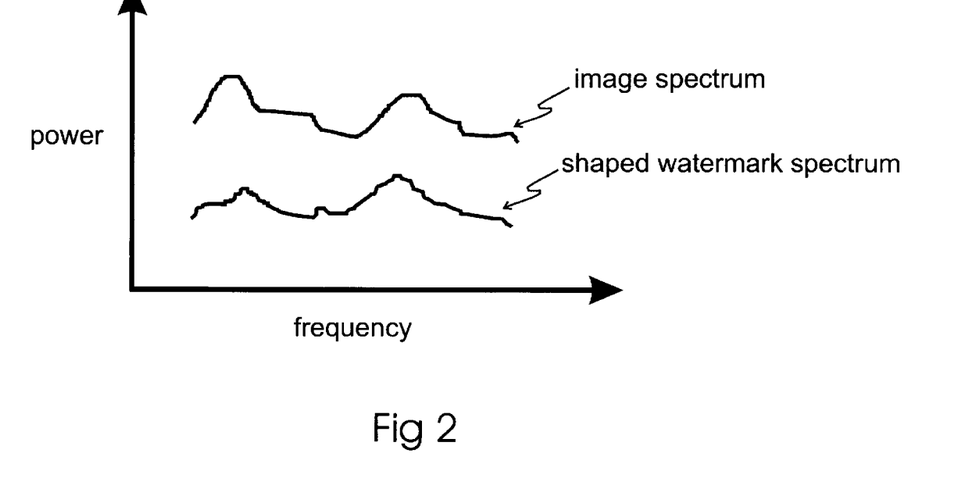
FIG. 2 is a graphical representation of the image spectrum and shaped watermark spectrum.

There are different ways to combine the watermark with the image spectrum. In the preferred embodiment, the watermark components, $W_i$, are added to the frequency coefficients, $f_i$, in a non-linear manner as $$f_i'=f_i+\alpha f_i W_i \quad (1)$$

where $\alpha$ is a constant typically in the range of 0.1 to 0.01. In principle, $\alpha$ might also vary as a function of frequency and perceptual modeling. Equation (1) can be considered a form of spectral shaping. That is, the original Gaussian white spectrum of the watermark is shaped to match that of the image by the second term in Equation (1) prior to addition of the two spectra. The constant a serves as a gain control to adjust the relative strength of the two spectra. This is graphically shown in FIG. 2.

Figure 3:
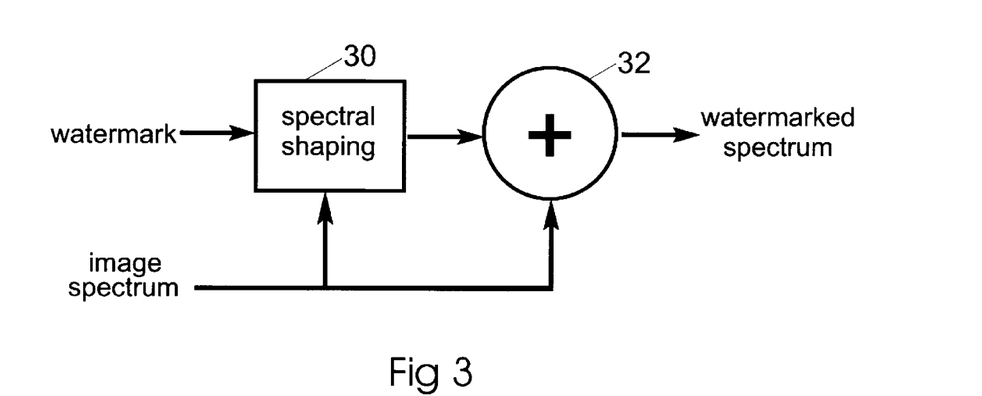
FIG. 3 is a schematic block diagram of a combiner.

The two stages of the combiner are shown in FIG. 3. The watermark to be embedded into the data is provided as a first input to a spectral shaper 30. The spectrum of the image to be watermarked is provided as a second input to the shaper 30. The output of shaper 30 is provided as a first input to summer 32. The spectrum of the image is provided as the second input to summer 32. The output of summer 32 is a watermarked spectrum.

Figure 4:
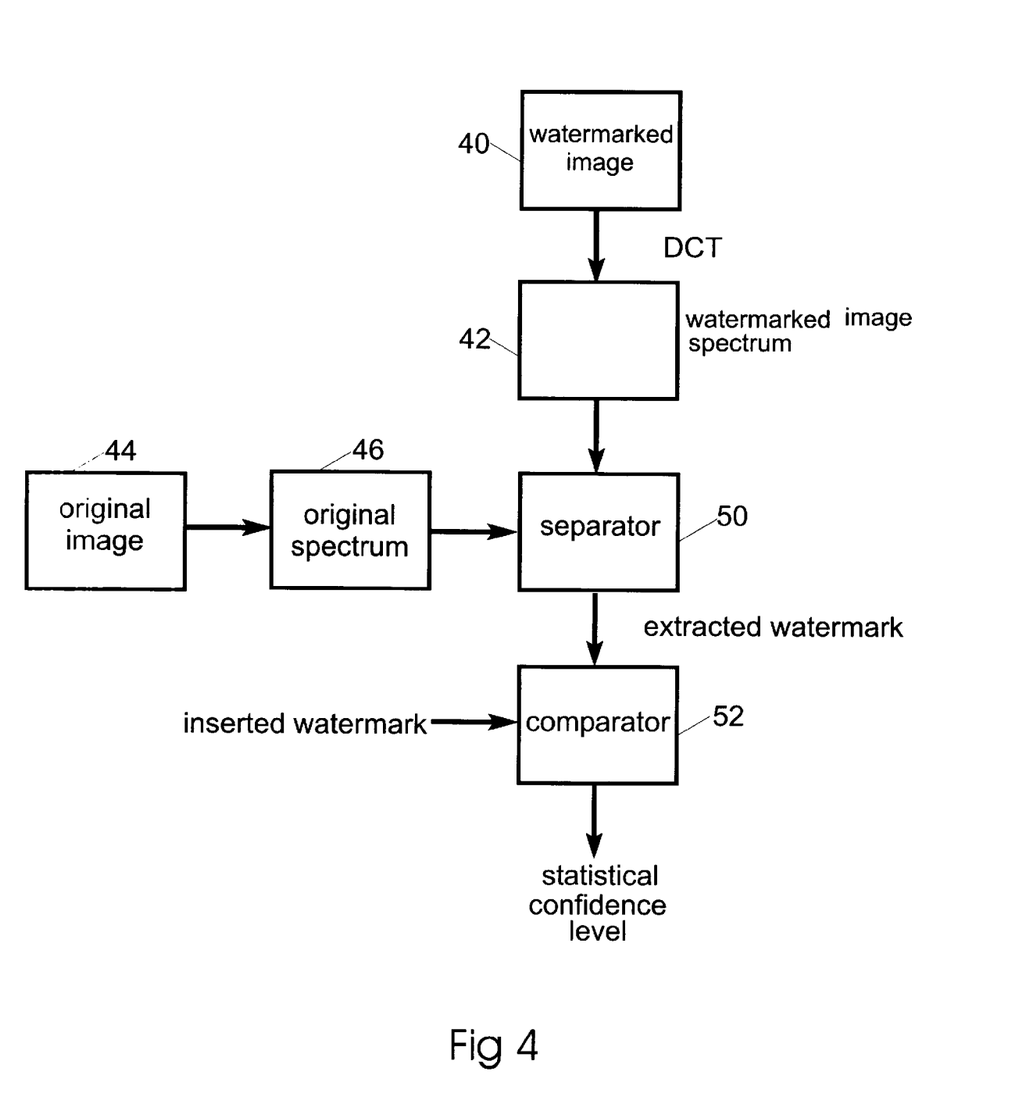
FIG. 4 is a schematic block diagram of a method of extracting a watermark from a watermarked image.

To extract the watermark, the inverse process must be applied as shown in FIG. 4. The separator stage inverts the combiner stage. In order to extract the watermark components, $W_i$, from a possibly distorted watermark image, first subtract the original image before dividing by the image spectral coefficients. The latter process serves to normalize or equalize the watermark spectrum back to its original shape. That is $$W_i=(f_i'-f_i)/\alpha f_i \quad (2)$$

Specifically, the watermarked image 40 is transformed by a discrete cosine transform or other transformation such at FFT, into a watermarked image spectrum 42. The stored original image 44 is transformed into an original image spectrum 46.

Figure 5:
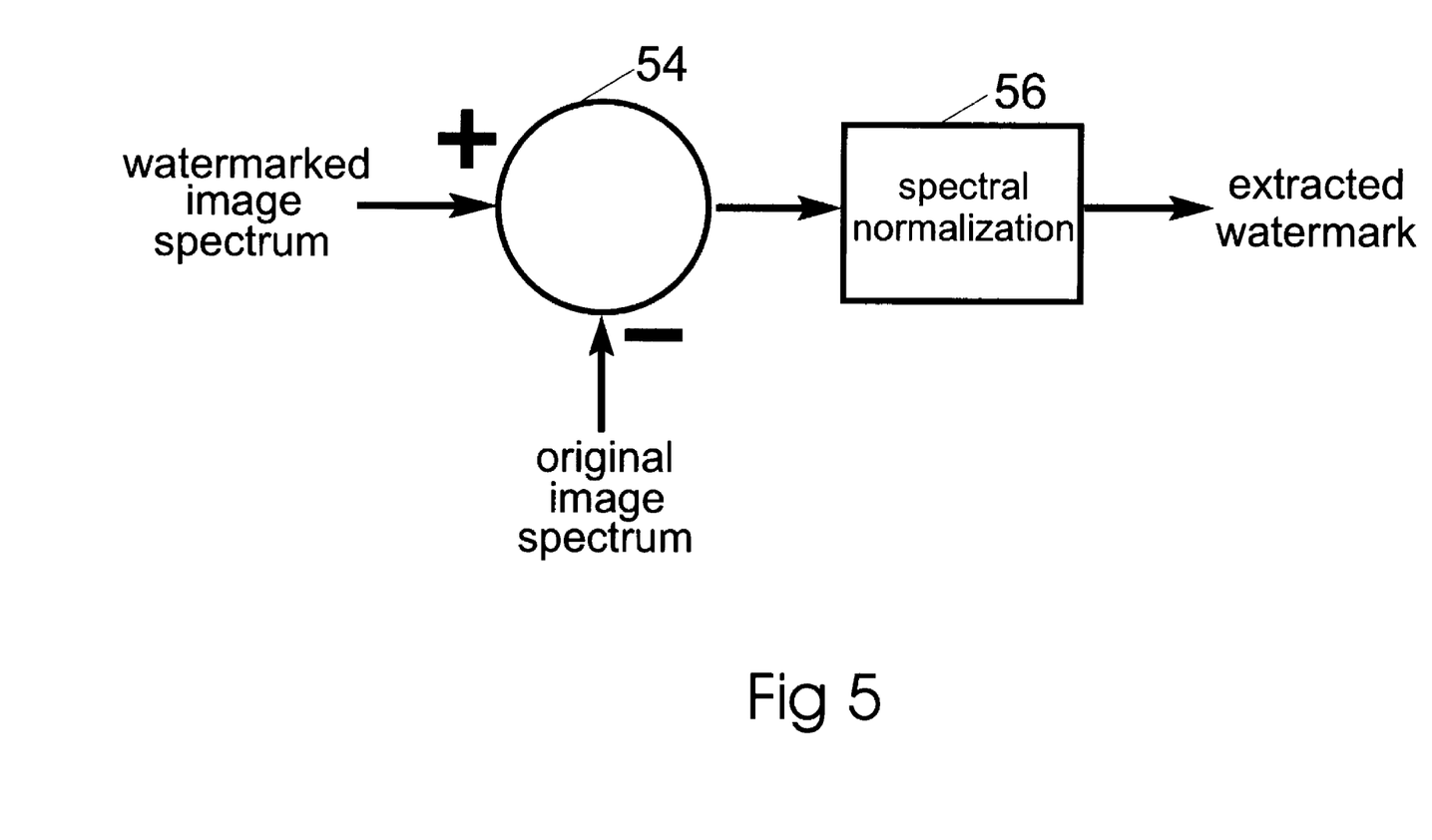
FIG. 5 is a schematic block diagram of a separator.

The watermarked image spectrum 42 and the original image spectrum 46 are provided as inputs to separator 50. The separator, as shown in FIG. 5, subtracts the original image spectrum from the watermarked image spectrum 54 to obtain a difference image spectrum prior to normalizing the resultant image. The spectral normalization 56 divides the difference image spectrum by the image spectral coefficients $\alpha f_i$ to yield an extracted watermark.

The extracted watermark is statistically compared with the known inserted watermark to calculate a statistical confidence level. The statistical confidence level provides a measure of whether the external watermark is the actual inserted watermark.

In the above described method of extracting a watermark, it is necessary to have an original unwatermarked image. This is both an advantage and limitation of the method. It is advantageous because it is difficult for a non-possessor of the image to remove the watermark. A limitation of the method is that it prevents a third party's software or hardware devices from extracting or reading the embedded signal information. The use of a Gaussian noise distribution is important for extraction using an original image.

Figure 6:
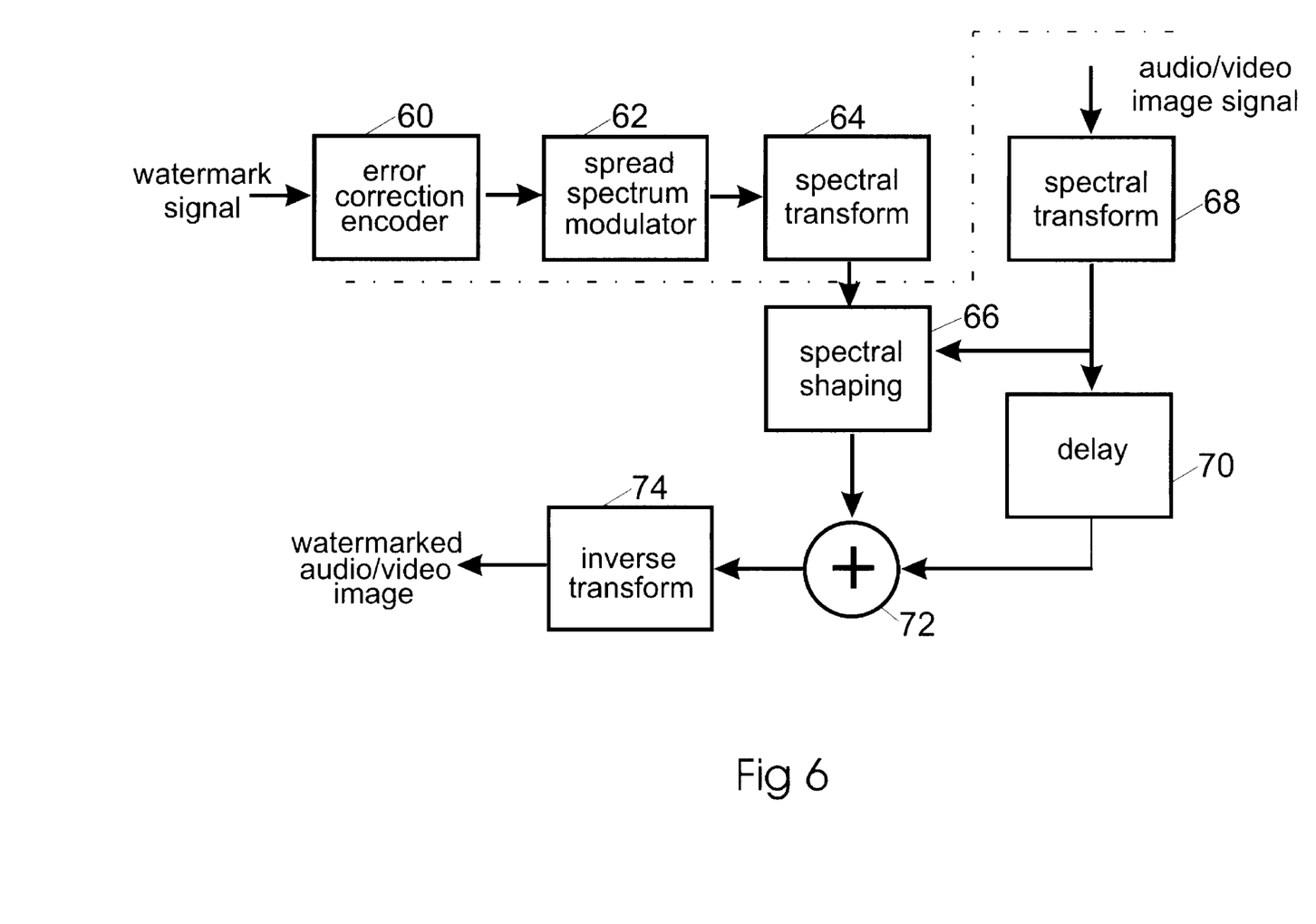
FIG. 6 is a schematic block diagram of a spread spectrum system for use in watermark insertion.

The above described prior art system is a special case of a more general spread spectrum communication system in which the watermark information is considered as the signal and the image is considered as the noise. FIG. 6 is a schematic block diagram of a special spectrum communication system for use in watermark insertion.

In FIG. 6 a watermark signal is provided as an input to an error correction encoder 60. The output of encoder 60 is provided to a spread spectrum modulator 62. The output of modulator 62 is provided to a spectral transformation 64. The output of spectral transformation 64 is provided as one input to a spectral shaper 66. A signal to be watermarked is provided to a spectral transformer 68. The output of the transformer 68 is provided as a second input to spectral shaper 66 and to a delay 70. The output of the spectral shaper 66 is added to the output of delay 70 at a summer 72. The summer output is subject to an inverse transform 74. The result of the inverse transform is a watermarked signal.

In the prior systems, the object was to embed a single PN (pseudo random number) sequence into an image. The information associated with the PN sequence was assumed to be stored in a database together with the original image and the spectral location of the embedded watermark. The locations of the watermarked components had to be recorded because the implementation approximated the N perceptionally most significant regions of the watermark by the N largest coefficients. However, this ranking was not invariant to the watermarking process. The N largest coefficients may be different after inserting the watermark than before intersecting the watermark.

In order to avoid this problem, the current method places a watermark in predetermined locations of the spectrum, typically the first N coefficients, However, any predetermined locations could be used even though such locations should belong to the perceptually significant regions of the spectrum if the watermark is to survive common signals transformations such as compression, scaling, etc.

More generally, the information to be embedded is a sequence of m symbols drawn from an alphabet A (e.g. the binary digits or the ASCII symbols). This data is then supplemented with additional symbols for error detection and correction. Each symbol is then spread spectrum modulated, a process that maps each symbol into a unique PN sequence known as a chip. The number of bits per chip is preset—the longer the chip length, the higher the detected signal-to-noise ratio will be, but this is at the expense of signaling bandwidth.

The spectrum of the PN sequence is white, i.e. flat, and is therefore shaped to match that of the "noise", i.e. the image/video/audio/or multimedia data into which the watermark is to be embedded. It is this spectral shaping that must be modified from the prior methods so that the extraction process no longer requires the original image. To do this, Equation (1) is modified so that each coefficient of the watermarked spectrum is scaled by the local average of the image spectral coefficient rather than the coefficient itself, i.e.

$$f_i' = f_i + \alpha \, avg(f_i) W_i \quad (3)$$

This average may be obtained in several ways. It may be a local average over a two dimensional region. Alternatively, the two dimensional spectrum may be sampled to form a one dimensional vector and a one dimensional local average may be performed. The latter method was used in experimental results below. The average may be a simple box or weighted average over the neighborhood.

For video data, temporal averaging of the spectral coefficients over several frames can also be applied. However, since several frames are needed for averaging at the spectral normalization stage of the extractor, the protection of individual video frames taken in isolation may not be possible. For this reason, the present invention treats video as a very large collection of still images. In this way, even individual video frames are copy protected.

Figure 7:
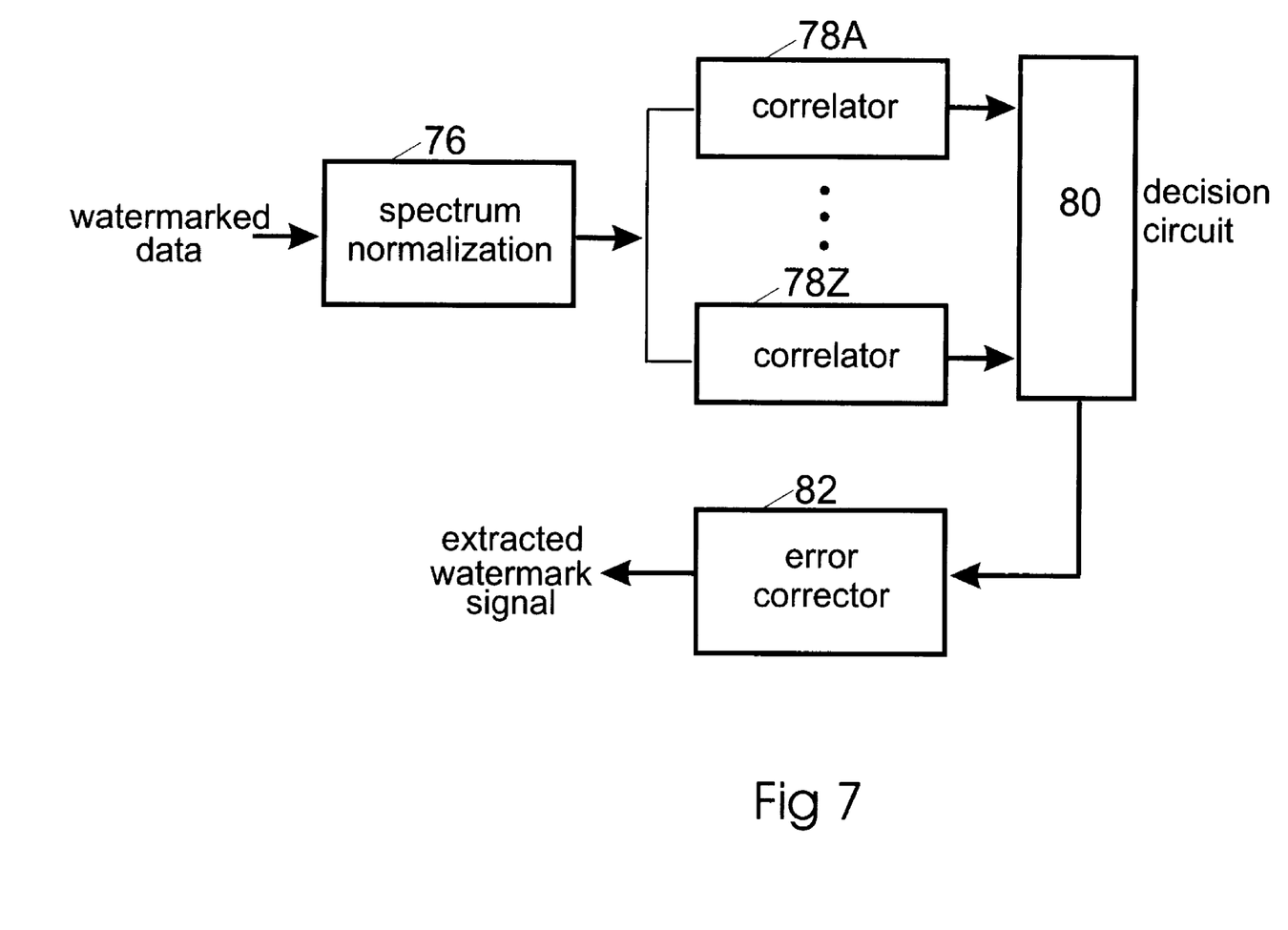
FIG. 7 is a schematic block diagram of a spread spectrum receiver.

Receiving or extracting a spread spectrum signal is shown in FIG. 7. The watermarked image, video, audio or multimedia data is first spectrally normalized 76 to undo any previously performed spectral shaping. The normalized signal is then analyzed by a bank of correlators 78A . . . 78Z, each correlator detecting the presence, if any, of a particular PN sequence (one for each symbol in the alphabet). The decision circuit 80 typically selects the correlator with the maximum output as the most likely current symbol. More sophisticated decision procedures are possible. The sequence of most likely current symbols is then provided as an input to an error correction stage 82 which corrects for false decisions made by the decision circuit. The output of the error correction stage is an extracted watermark signal. In order to perform the spectral normalization 76, the previously performed spectral shaping procedure is inverted. In the present case, the original unwatermarked signal is no longer available. Thus, an average of the frequency coefficients, $avg(f_i)$, as approximated by the average of the watermarked signal, i.e. $avg(f_i')$ $$avg(f_i) \approx avg(f_i') \quad (4)$$

This is approximately true since the second term of equation (3) is small relative to the first i.e.

$$\alpha \, avg(f_i) W_i << f_i \quad (5)$$

The normalization stage then divides each coefficient ($f_i'$) in the received signal by the local average avg ($f_i'$) in the neighborhood.

That is, $$\frac{f_i'}{avg(f_i')} = \frac{f_i + \alpha \, avg(f_i) W_i}{avg(f_i')} \quad (6)$$

$$\approx \frac{f_i}{avg(f_i')} + \alpha W_i$$

The first term, on the right hand side (RHS) of Equation (6), $$\frac{f_i}{avg(f_i')},$$

is considered a noise term. It was not present in the prior systems because access to the unwatermarked coefficients allowed this term to be removed. The second term $\alpha W_i$ is the original watermark signal which can now be detected using conventional correlation.

Figure 8:
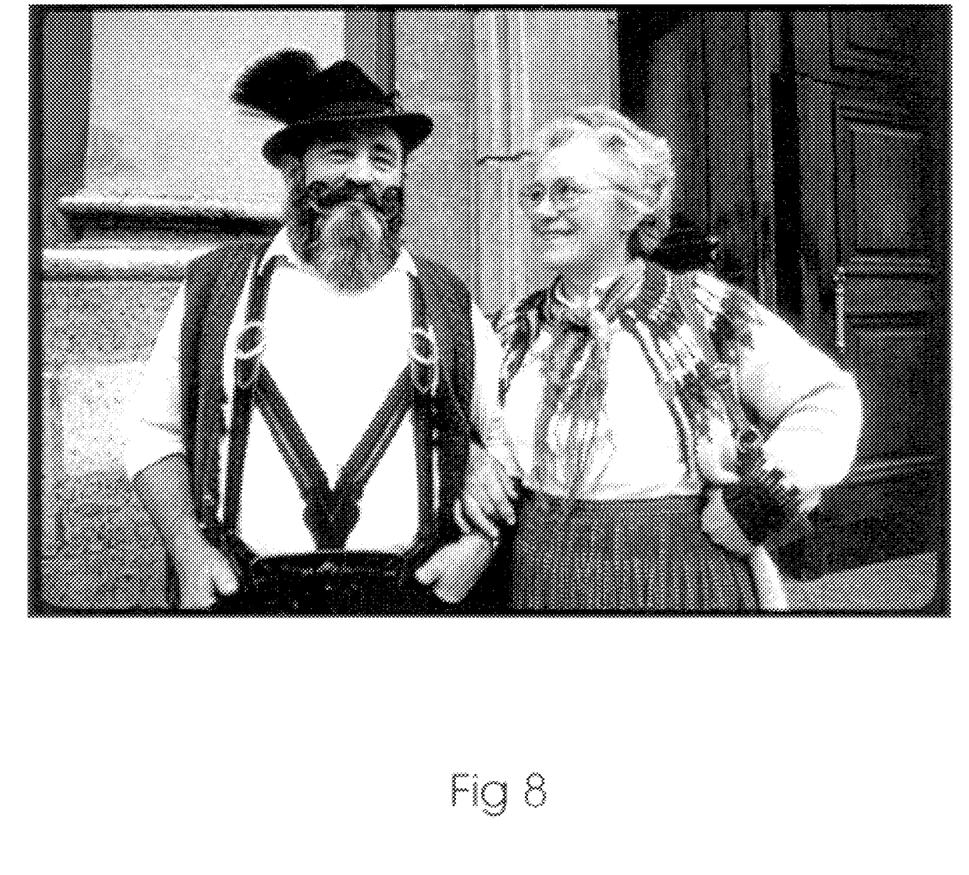
FIG. 8 is an original image to be watermarked.
Figure 9:
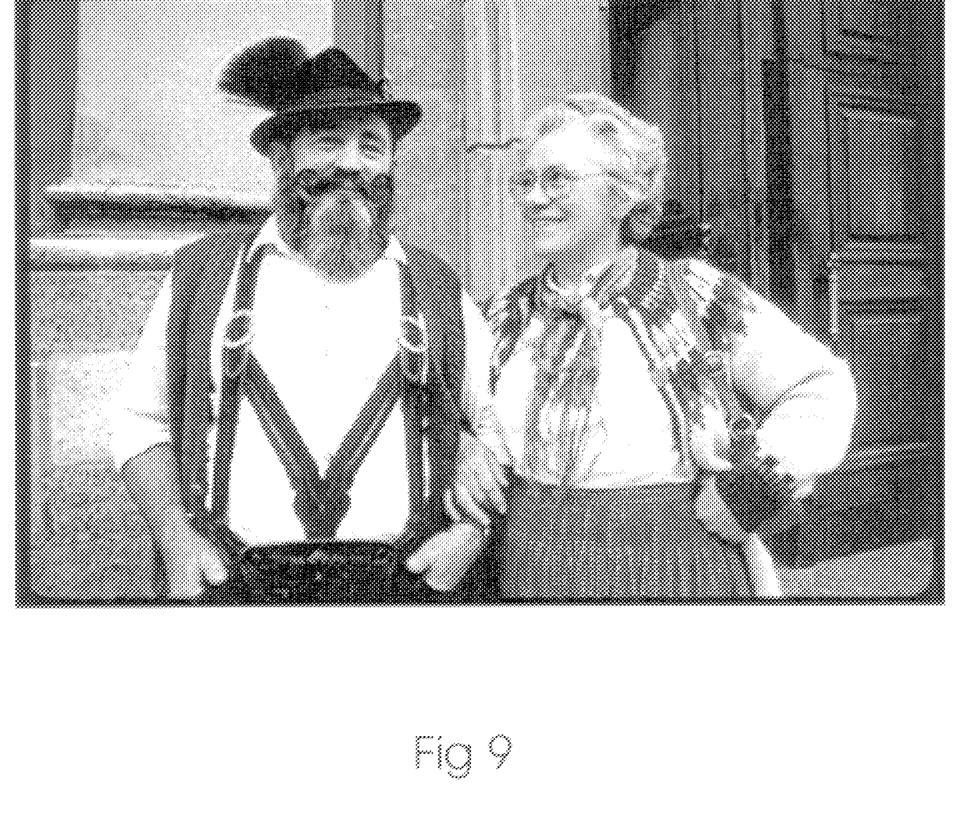
FIG. 9 is the image in FIG. 8 after being watermarked.

FIG. 8 shows an original image before being watermarked. FIG. 9 is the same image after being watermarked in accordance with the teachings of the present invention.

Figure 10:
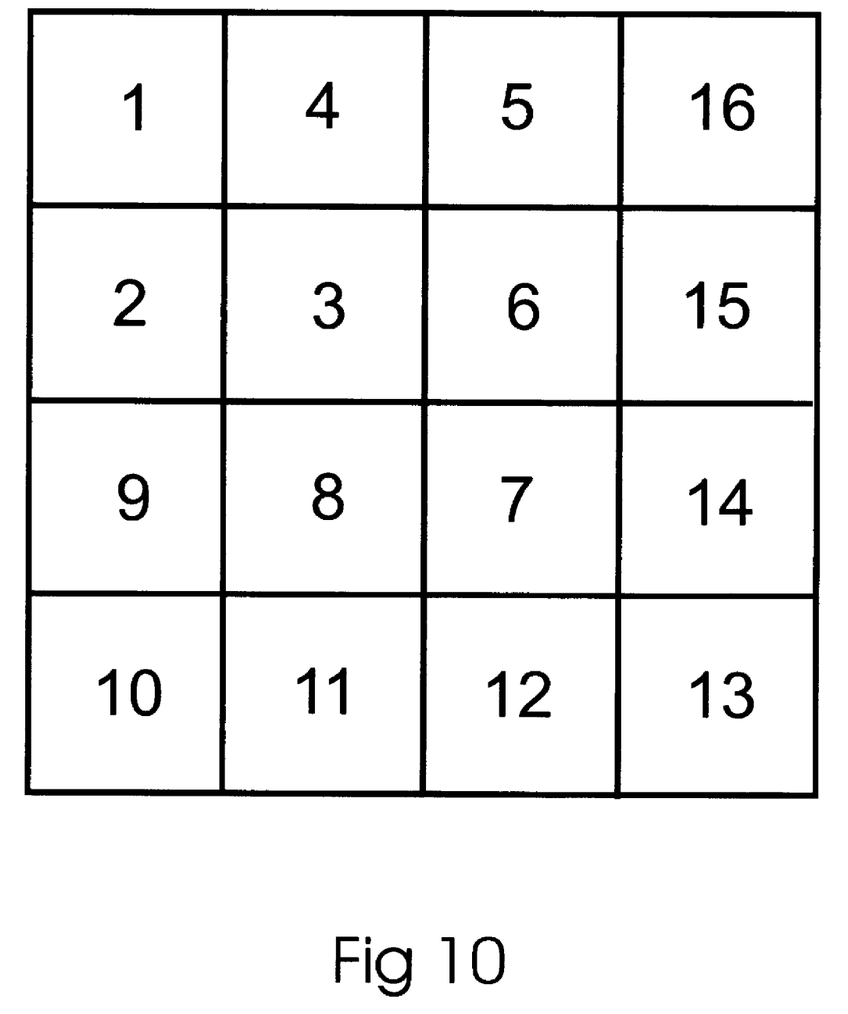
FIG. 10 shows a 4×4 array indicating the sequence of coefficients used to form a one-dimensional vector.

The watermark in FIG. 9 was inserted using a gain of $\alpha=0.1$ and a chip length of 10,000. The first 10,000 coefficients of the original image were extracted in the sequence shown in FIG. 10 to form a one dimensional vector. A block average was then computed over a rectangular window of ±3 coefficients. The same procedure was applied at the extraction stage.

The correlator responds to randomly generated PN sequences with one such sequence being set to the originally inserted sequence indicated. A very strong and unambiguous response on 0.125 was detected for a particular PN sequence. For uncorrelated watermarks, the correlator output is approximately Normally distributed with a variance of $1/(N-2)$, where N is the length of the watermark. Thus, for N=10,000, the standard deviation is 0.01 and the correlation response of 0.125 represents over 12 standard deviations. A response of approximately 30 deviations was achieved with the prior art method using a watermark length of only 1,000. The reduction in signal-to-noise ratio is due almost entirely to the first term of the right-hand side of Equation (6) which is not present when using the prior art method.

In order to determine the closeness of the approximation of Equation (4), the equalization process was repeated using the original shaping coefficients, i.e. $avg(f_i)$, instead of $avg(f_i')$. The correlator response increase from 0.125 to 0.15, suggesting that a loss of approximately 20% was incurred due to this approximation. Of course, this loss is strongly dependent of the local smoothness in the spectra of an image and may vary significantly from image to image.

In summary, the present invention provides a modification to existing digital watermarking methods in which the original data was required for watermark extraction thereby enabling watermarking extraction in the absence of an unwatermarked or original data. The present invention uses local spatial and/or temporal local averaging of the frequency coefficients. The result is extraction of the watermark with very high confidence.

While there has been described and illustrated a system for inserting a watermark into and extracting a watermark from watermarked data without using an unwatermarked version of the data, it will be apparent to those skilled in the art that variations and modifications are possible without deviating from the broad principles and teachings of the present invention which shall be limited solely by the scope of the claims appended hereto.

What is claimed is:

1. A method of extracting a watermark from watermarked data comprising the steps of:

receiving watermarked data;

spectrum normalizing the watermarked data to generate a normalized signal;

correlating the normalized signal with predetermined PN sequences corresponding to predetermined symbols to provide correlated signals for each predetermined PN sequence;

deciding which PN sequence is present in the watermarked data based upon said correlated signals; and extracting a watermark corresponding to a sequence of PN sequences present.

2. A method of extracting a watermark from watermarked data as set forth in claim 1, where said spectrum normalizing removes any spectral shaping performed when the watermark was inserted into the watermarked data.

3. A method of extracting a watermark from watermarked data as set forth in claim 1, where said spectrum normalizing determines local average of the frequency coefficients of the spectrum of the watermarked data and then divides each frequency coefficient of the spectrum of the watermarked data by the local average of the frequency coefficients.

4. A method of extracting a watermark from watermarked data as set forth in claim 1, where said watermarked data is audio data.

5. A method of extracting a watermark from watermarked data as set forth in claim 1, where said watermarked data is video data.

6. A method of extracting a watermark from watermarked data as set forth in claim 1, where said watermarked data is image data.

7. A method of extracting a watermark from watermarked data as set forth in claim 1, where said watermarked data is multimedia data.

8. A method for inserting a watermark into data comprising the steps of:

providing a watermark;

providing a spectrum of the data;

shaping the spectrum of the watermark commensurate with the average spectrum of the data; and combining the shaped spectrum watermark with the spectrum of the data to obtain watermarked data spectrum.

9. A method for inserting a watermark into data as set forth in claim 8, where said average is a local average over a two dimensional region of said data.

10. A method for inserting a watermark into data as set forth in claim 9, where said average is a weighted average over a neighborhood of said data.

11. A method for inserting a watermark into data as set forth in claim 8, where said average is a temporal average over several frames of video data.

12. A method for inserting a watermark into data as set forth in claim 8, where said data is audio data.

13. A method for inserting a watermark into data as set forth in claim 8, where said data is video data.

14. A method for inserting a watermark into data as set forth in claim 8, where said data is image data.

15. A method for inserting a watermark into data as set forth in claim 8, where said data is multimedia data.

16. A method of inserting a watermark into data comprising the steps of:

providing a watermark signal, providing a spectrum of the data;

shaping the spectrum of the watermark signal to be commensurate with the spectrum of the data; and summing the shaped spectrum watermark signal with the spectrum of the data to obtain watermarked data spectrum.

17. A method of inserting a watermark into data as set forth in claim 16, where said shaping the spectrum of the watermark shapes the spectrum commensurate with temporal averages of frequency coefficients of the spectrum of the data.

18. A method of inserting a watermark into data as set forth in claim 16, where said shaping the spectrum of the watermark signal shapes the spectrum commensurate with local averages of frequency coefficients of the spectrum of the data.

19. A method of inserting a watermark into data as set forth in claim 16, where said data is audio data.

20. A method of inserting a watermark into data as set forth in claim 16, where said data is video data.

21. A method of inserting a watermark into data as set forth in claim 16, where said data is image data.

22. A method of inserting a watermark into data as set forth in claim 16, where said data is multimedia data.

* * * * *